United States Patent
Shapira et al.

(10) Patent No.: US 9,426,810 B2
(45) Date of Patent: *Aug. 23, 2016

(54) AIRTIME-AWARE SCHEDULING FOR WIRELESS LOCAL-AREA NETWORK

(71) Applicant: Celeno Communications (Israel) Ltd., Raanana (IL)

(72) Inventors: Nir Shapira, Ra'anana (IL); Oren Hencinski, Holon (IL); Meir Shiri, Hod Hasharon (IL); Boris Gimelbrand, Petah Tikva (IL); Amir Helfan, Tel Aviv (IL)

(73) Assignee: Celeno Communications (Israel) Ltd., Raanana (IL)

( * ) Notice: Subject to any disclaimer, the term of this patent is extended or adjusted under 35 U.S.C. 154(b) by 162 days.

This patent is subject to a terminal disclaimer.

(21) Appl. No.: 14/203,614

(22) Filed: Mar. 11, 2014

(65) Prior Publication Data

US 2014/0269635 A1 Sep. 18, 2014

Related U.S. Application Data

(60) Provisional application No. 61/778,754, filed on Mar. 13, 2013, provisional application No. 61/902,807, filed on Nov. 12, 2013.

(51) Int. Cl.
*H04W 72/08* (2009.01)
*H04W 72/04* (2009.01)
*H04W 72/12* (2009.01)

(52) U.S. Cl.
CPC .............. *H04W 72/08* (2013.01); *H04W 72/04* (2013.01); *H04W 72/1252* (2013.01); *H04W 72/1242* (2013.01)

(58) Field of Classification Search
None
See application file for complete search history.

(56) References Cited

U.S. PATENT DOCUMENTS

| | | |
|---|---|---|
| 5,742,590 A | 4/1998 | Lin et al. |
| 7,848,307 B2 | 12/2010 | Chen et al. |
| 8,300,611 B2 | 10/2012 | Nandagopalan |
| 8,345,656 B2 | 1/2013 | Schmitt et al. |
| 8,483,194 B1 | 7/2013 | Wu et al. |
| 2008/0144599 A1 | 6/2008 | Chen et al. |

(Continued)

FOREIGN PATENT DOCUMENTS

EP 2257112 A1 12/2010

OTHER PUBLICATIONS

IEEE Standard 802.11n, "IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput", 536 pages, Oct. 29, 2009.

(Continued)

*Primary Examiner* — Edan Orgad
*Assistant Examiner* — Saumit Shah
(74) *Attorney, Agent, or Firm* — D. Kligler IP Services Ltd.

(57) ABSTRACT

A method for communication includes accepting in an Access Point (AP) data items for transmission over a wireless channel to multiple terminals served by the AP. Aggregate airtimes, which were previously allocated to the respective terminals on the wireless channel, are assessed. Transmission of the data items is scheduled depending on the aggregate airtimes.

23 Claims, 4 Drawing Sheets

(56) References Cited

U.S. PATENT DOCUMENTS

| | | | |
|---|---|---|---|
| 2008/0159319 A1* | 7/2008 | Gast | H04L 12/5693 370/412 |
| 2011/0255466 A1 | 10/2011 | Gast et al. | |
| 2012/0311173 A1* | 12/2012 | Agarwal | H04L 43/0829 709/231 |
| 2013/0094486 A1 | 4/2013 | Bhanage et al. | |
| 2013/0100807 A1* | 4/2013 | Bhanage | H04W 4/26 370/232 |
| 2014/0078969 A1* | 3/2014 | Guo | H04W 72/121 370/329 |
| 2014/0269634 A1 | 9/2014 | Shapira et al. | |

OTHER PUBLICATIONS

IEEE Standard 802.11ac, "IEEE Standard for Information technology—Telecommunications and information exchange between systems Local and metropolitan area networks—Specific requirements Part 11: Wireless LAN Medium Access Control(MAC) and Physical Layer (PHY) Specifications; Amendment 4: Enhancements for Very High Throughput for Operation in Bands below 6 GHz", 425 pages, Dec. 11, 2013.

Garroppo et al., "Providing air-time usage fairness in IEEE 802.11 networks with the deficit transmission time (DTT) scheduler", Wireless networks, vol. 13, issue 4, 26 pages, Dec. 31, 2007.

Jiang et al., "Proportional Fairness in Wireless LANs and Ad Hoc Networks", Wireless Communications and Networking Conference, vol. 3, 6 pages, Mar. 17, 2005.

Bhanage et al., "SplitAP: Leveraging Wireless Network Virtualization For Flexible Sharing Of WLANs", 2010 IEEE Global Telecommunications Conference (GLOBECOM 2010), 6 pages, Dec. 6-10, 2010.

P802.11e/D13.0, "IEEE Standard for Information technology—Telecommunications and information exchange between systems—Local and metropolitan area networks—Specific requirements, Part 11: Wireless LAN Medium Access Control (MAC) and Physical Layer (PHY) specifications: Amendment : Medium Access Control (MAC) Quality of Service Enhancements", 198 pages, Jan. 2005.

International Application # PCT/IB2014/059561 Search Report dated Jul. 13, 2014.

* cited by examiner

AIRTIME-AWARE SCHEDULING FOR WIRELESS LOCAL-AREA NETWORK

CROSS-REFERENCE TO RELATED APPLICATIONS

This application is related to a U.S. patent application entitled "Prioritized airtime-aware scheduling for wireless local-area network," filed on even date. This application claims the benefit of U.S. Provisional Patent Application 61/778,754, filed Mar. 13, 2013, and U.S. Provisional Patent Application 61/902,807, filed Nov. 12, 2013. The disclosures of these related applications are incorporated herein by reference.

FIELD OF THE INVENTION

The present invention relates generally to wireless communication, and particularly to methods and systems for airtime-aware scheduling.

BACKGROUND OF THE INVENTION

A Wireless Local-Area Network (WLAN) typically comprises one or more Access Points (APs) that communicate with stations (STAs). WLAN communication protocols are specified, for example, in the IEEE 802.11 family of standards, such as in the 802.11n-2009 standard entitled "IEEE Standard for Information technology—Local and metropolitan area networks—Specific requirements—Part 11: Wireless LAN Medium Access Control (MAC) and Physical Layer (PHY) Specifications Amendment 5: Enhancements for Higher Throughput," 2009; and in the 802.11ac-2013 standard entitled "IEEE Standard for Information technology—Local and metropolitan area networks—Specific requirements—Part 11: Wireless LAN Medium Access Control (MAC) and Physical Layer (PHY) Specifications Amendment 4: Enhancements for Very High Throughput for Operation in Bands below 6 GHz," 2013, which are both incorporated herein by reference. WLANs are also commonly referred to as Wi-Fi networks.

A WLAN AP typically employs a certain scheduling scheme for scheduling transmissions of different STAs. For example, the Wi-Fi Alliance™ promotes a scheduling scheme called Wi-Fi Multi-Media (WMM®). Quality-of-Service (QoS) scheduling for WLAN is described, for example, in IEEE document P802.11e/D13.0 entitled "Amendment: Medium Access Control (MAC) Quality of Service (QoS) Enhancements," January, 2005, which is incorporated herein by reference.

SUMMARY OF THE INVENTION

An embodiment of the present invention that is described herein provides a method for communication including accepting in an Access Point (AP) data items for transmission over a wireless channel to multiple terminals served by the AP. Aggregate airtimes, which were previously allocated to the respective terminals on the wireless channel, are assessed. Transmission of the data items is scheduled depending on the aggregate airtimes.

In some embodiments, scheduling the transmission includes scheduling the transmission of the data items regardless of Quality-of-Service (QoS) classes with which the data items are associated. In an embodiment, scheduling the transmission includes allocating a next transmission slot to a terminal that was previously allocated a smallest aggregate airtime among the terminals served by the AP.

In a disclosed embodiment, the method includes periodically resetting the aggregate airtimes. In an alternative embodiment, assessing the aggregate airtimes includes assessing respective differences between the aggregate airtimes and a minimal aggregate airtime, and scheduling the transmission includes scheduling the transmission depending on the differences.

In another embodiment, scheduling the transmission includes assigning respective time slots to the terminals, while constraining a maximum duration of the time slots. In some embodiments the method includes, in addition to scheduling the data items depending on the aggregate airtimes, applying to the data items an additional scheduling operation depending on respective QoS classes with which the data items are associated. Applying the additional scheduling operation may include applying an Access Class (AC) based scheduler.

In another embodiment, the method includes weighting the aggregate airtimes with respective weights that are assigned to the data items depending on traffic categories with which the data items are associated, and scheduling the transmission includes scheduling the transmission of the data items depending on the weighted aggregate airtimes. In yet another embodiment, assessing the aggregate airtimes includes summing the aggregate airtimes on both a downlink direction of the wireless channel from the AP to the terminals and on an uplink direction of the wireless channel from the terminals to the AP. Summing the aggregate airtimes may include applying respective different weights to the aggregate airtimes on the downlink direction and on the uplink direction.

In still another embodiment, the method includes scheduling the transmission of uplink data items from the terminals to the AP depending on the aggregated airtimes assigned to the respective terminals on an uplink direction of the wireless channel. In an embodiment, scheduling the transmission includes reducing airtime allocation to a given terminal upon detecting an overflow in the data items addressed to the given terminal. In another embodiment, each of the terminals is associated with one of multiple virtual networks, and scheduling the transmission includes assigning airtime to each of the virtual networks depending on the assessed aggregate airtimes. In an embodiment, the multiple virtual networks are identified with respective different Basic Service Set Identifiers (BSSIDs).

In another embodiment, scheduling the transmission includes assigning airtime to multiple streams that are addressed to a same terminal. In yet another embodiment, scheduling the transmission includes assigning airtime to multiple different streams that belong to a same QoS class. In still another embodiment, scheduling the transmission includes associating the data items with respective Access Classes (ACs) of an AC-based scheduling scheme in accordance with requested priorities of the data items and regardless of actual traffic types of the data items, and scheduling the data items using the AC-based scheduling scheme based on the associated ACs. Scheduling the transmission may include identifying a dominant terminal whose actual airtime exceeds an expected share of airtime relative to other terminals, and temporarily throttling-down Transmission Control Protocol (TCP) transmission to the dominant terminal.

There is additionally provided, in accordance with an embodiment of the present invention, a wireless Access Point (AP) including a transmitter and a processor. The transmitter is configured to transmit data items over a wireless channel to multiple terminals served by the AP. The processor is configured to assess aggregate airtimes that were previously allocated to the respective terminals on the wireless channel, and to schedule transmission of the data items depending on the aggregate airtimes.

There is further provided, in accordance with an embodiment of the present invention, system including multiple terminals and an Access Point (AP). The AP is configured to transmit data items over a wireless channel to the terminals, to assess aggregate airtimes that were previously allocated to the respective terminals on the wireless channel, and to schedule transmission of the data items depending on the aggregate airtimes.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for scheduling traffic in Wireless Local-Area Networks (WLANs) and other wireless communication systems. In the disclosed embodiments, an Access Point (AP) schedules transmissions to multiple terminals (e.g., WLAN STAs) depending on the actual airtime that was previously allocated to the terminals.

In some embodiments, the AP measures the aggregate airtime that was previously allocated to each terminal or group of terminals on the wireless channel, and assigns the next transmission slot to the terminal or group of terminals that was previously allocated the smallest aggregate airtime. This scheduling criterion is referred to as Minimum Aggregate Airtime (MAAT).

MAAT-based scheduling is highly effective in preventing terminals from dominating the airtime assignment and depriving other terminals of airtime. Such scenarios may occur, for example, when a terminal has a poor link budget and therefore requires a low data rate or a high retransmission rate. As will be described and demonstrated below, the disclosed MAAT-based scheduling schemes distribute the channel resources fairly among the terminals, and thus avoid starvation scenarios of this sort.

In some embodiments that are described herein, MAAT-based scheduling is combined with conventional IEEE 802.11e Access Class (AC) based scheduling. In other embodiments, MAAT-based scheduling is used for prioritizing or ensuring fairness among multiple virtual networks supported by the same AP, and as a method for airtime management for increasing Quality-of-Service (QoS). Other embodiments use MAAT-based scheduling for prioritizing multiple traffic streams addressed to the same terminal, or among multiple traffic streams of the same AC. A generalized weighted-MAAT scheduling scheme is also described.

System Description

Figure 1:
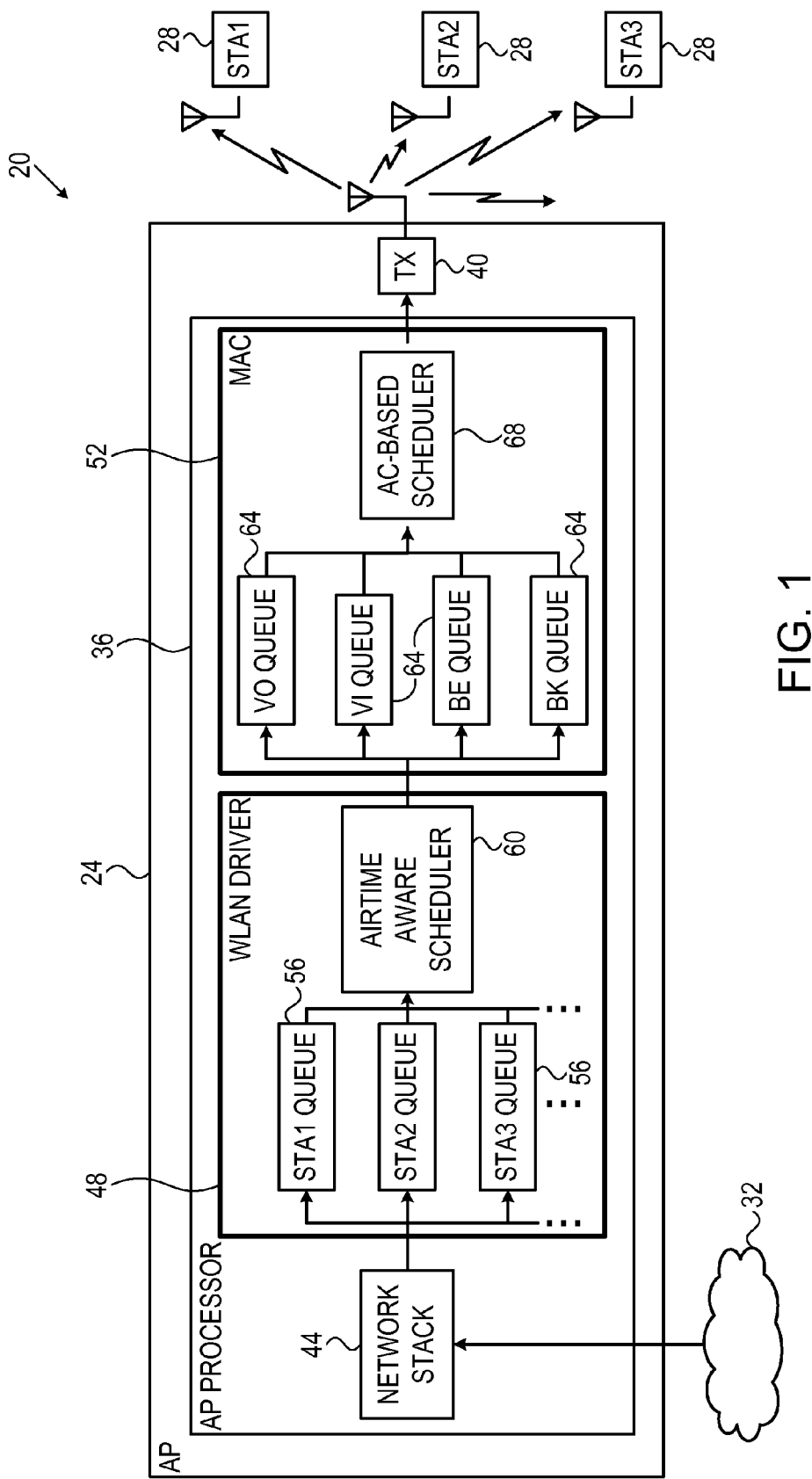
FIG. 1 is a block diagram that schematically illustrates a Wireless Local-Area Network (WLAN), in accordance with an embodiment of the present invention.

FIG. 1 is a block diagram that schematically illustrates a Wireless Local-Area Network (WLAN) 20, in accordance with an embodiment of the present invention. In the present example, WLAN 20 operates in accordance with the IEEE 802.11n or 802.11ac specifications, cited above. Alternatively, however, the disclosed techniques can be used with various other WLAN types. Moreover, the techniques described herein are not limited to WLAN applications and may be used for scheduling traffic in other types of wireless communication networks, e.g., cellular networks.

System 20 comprises an Access Point (AP) 24 that serves multiple wireless communication terminals 28, also referred to as stations or STAs. AP 24 is connected to a wired network 32, e.g., an Internet Protocol (IP) network. AP 24 comprises an AP processor 36 that carries out the various processing tasks of the AP, and a transmitter (TX) that transmits traffic to STAs 28. (The disclosed techniques are mainly concerned with transmission of traffic from the AP to the STAs, and therefore the figure focuses on AP elements relating to transmission rather than reception.)

Traffic arriving from network 32 is first processed in processor 36 by a network stack 44, then by a WLAN driver 48, and then by a Medium Access Protocol (MAC) unit 52. The functions of WLAN driver 48 and MAC unit 52 will be described in detail below. In the example of FIG. 1, WLAN driver 48 maintains multiple queues 56, one or more queues per each STA served by the AP. Each queue is used by the driver for queuing traffic addressed to the corresponding STA. Driver 48 schedules the traffic for transmission using an airtime-aware scheduler 60.

Scheduler 60 schedules the queued traffic for transmission depending on the actual aggregate airtime on the wireless channel that has been used by the various STAs. The scheduling scheme of scheduler 60 typically does not consider the Quality-of-Service (QoS) class or Access Class (AC) of the traffic. Thus, a given queue 56, corresponding to a given STA, may contain traffic items of different access classes (also referred to as QoS classes).

In MAC unit 52, the traffic produced by scheduler 60 is again queued and scheduled, this time based on Access Class (AC) or QoS class. MAC unit 52 maintains multiple queues 64, one queue per each access class. In the present example, MAC unit 52 comprises four queues 64 corresponding to four QoS classes: Voice-over-IP (VO), Video (VO), Best Effort (BE) and Background (BO). This classification conforms to IEEE 802.11e AC-based scheduling schemes. In alternative embodiments, other suitable QoS classification can be used.

An AC-based scheduler 68 schedules the traffic queued in queues 64, such that traffic of the VO class is scheduled with highest priority, then traffic of the VI class, then BE traffic, and BK traffic is scheduled with lowest priority. The traffic produced by AC-based scheduler 68 is provided to transmitter 40, which transmits the traffic to STAs 28.

In summary, AP processor 36 schedules traffic in two stages, first by STA, and then by QoS class.

The configurations of system 20 and AP 24 shown in FIG. 1 are example configurations, which are chosen purely for the sake of conceptual clarity. In alternative embodiments, any other suitable system and/or AP configuration can be used. For example, AP processor 36 may schedule the traffic only using airtime-aware scheduler 60 (depending on STA-specific aggregate airtime), without following with QoS-dependent scheduling.

Figure 4A:
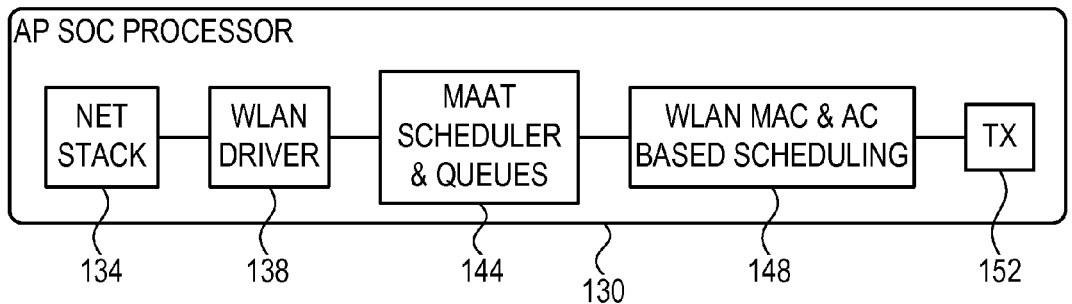
FIGS. 4A-4C are block diagrams that schematically illustrate example AP configurations, in accordance with embodiments of the present invention.
Figure 4B:
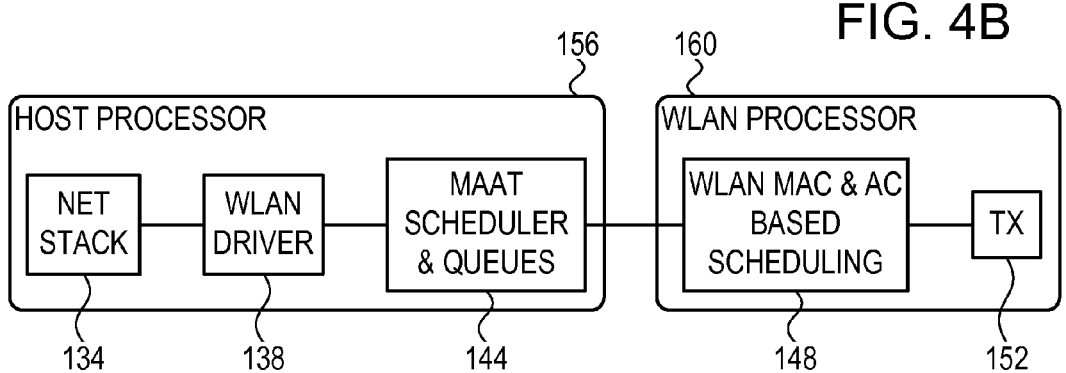
Figure 4C:
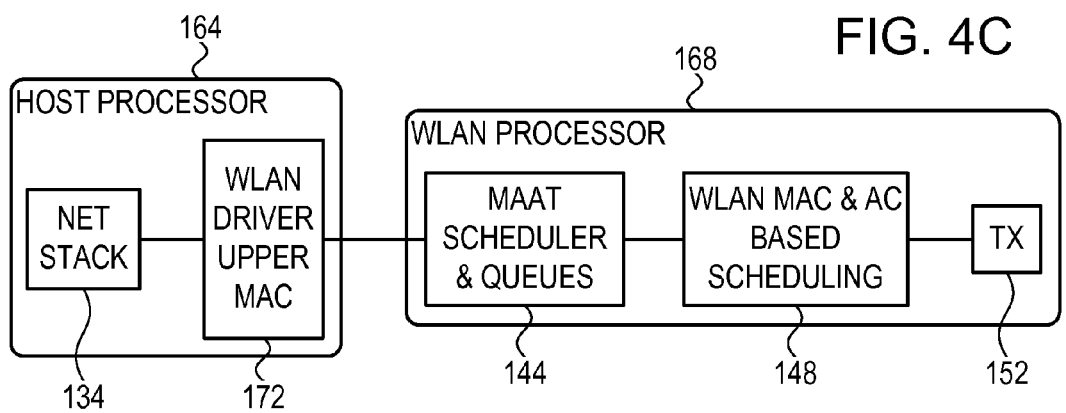

In another embodiment, AP processor 36 may implement a separate airtime-aware scheduler 60 for each IEEE 802.11e AC-based scheduling access class. In such an implementation, the traffic in each queue 64 (VO, VI, BE and BK queues) is scheduled based on aggregate airtime. Traffic streams belonging to different access classes do not interact or compete against one another for scheduling. Further alternatively, the AP processor may combine airtime-aware STA-based scheduling with QoS-dependent scheduling in any other suitable way. Additional possible AP configurations are shown in FIGS. 4A-4C below.

The different elements of AP 24, e.g., AP processor 36, may be implemented using suitable hardware, such as in an Application-Specific Integrated Circuit (ASIC) or Field-Programmable Gate Array (FPGA). In some embodiments, some AP elements, e.g., AP processor 36, can be implemented using software, or using a combination of hardware and software elements. AP elements that are not mandatory for understanding of the disclosed techniques, e.g., elements relating to reception of traffic from the STAs, have been omitted from the figure for the sake of clarity.

In some embodiments, AP processor 36 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Airtime-Aware, QoS-Independent Scheduling

In the disclosed embodiments, scheduler 60 schedules successive transmission time slots from AP 24 to STAs 28. Typically, the scheduler limits only the maximum length of the slot without necessarily enforcing equal-length slots. In other words, the slot length used by the AP for transmitting to a given STA depends on the amount of traffic queued in queue 56 corresponding to this STA, up to a certain maximum slot length.

In an embodiment, when preparing to assign the next transmission slot, scheduler 60 assesses the aggregate airtime that was previously assigned on the wireless channel for transmission to each STA. The scheduler assigns the next transmission slot to the STA having the smallest aggregate airtime. This criterion is referred to herein as Minimum Aggregate Airtime (MAAT). This criterion ensures that, on average, the channel airtime is distributed fairly among the STAs, without risk that a particular STA will consume the channel resources for a prolonged time period at the expense of other STAs.

The term "aggregate airtime" refers to the overall duration of time on the wireless channel that was assigned to communication with a given STA. The aggregate airtime depends not only on the amount of data transmitted to the STA, but also on the channel conditions between the AP and the STA. For the same amount of data, an STA having poor channel conditions will consume more airtime because of the need to transmit with lower bit rate, higher retransmission rate and/or higher coding redundancy.

In some embodiments, scheduler 60 measures the aggregate airtimes for the various STAs starting from some common point in time. In such embodiments, the scheduler may occasionally (e.g., periodically) reset the measurement of aggregate airtimes and start accumulating the measurements from zero. The resetting operation is helpful, for example, in supporting new STAs that join the AP.

In an alternative embodiment, scheduler 60 may assign the next transmission slot based on the differences between the aggregate airtimes and the smallest aggregate airtime. This kind of normalization eliminates the need to reset the aggregate airtime measurements. Further alternatively, scheduler 60 may schedule the transmission slots based on any other suitable measure that is indicative of the aggregate airtimes, regardless of QoS class.

In some embodiments, the measurement of aggregate airtime is performed per group of STAs rather than per each individual STA. For example, as will be described in detail below, the AP may support several sub-networks identified by different Service Set Identifiers (SSIDs). In these embodiments, scheduler 60 queues the traffic and applies the MAAT criterion per SSID. Scheduling among the STAs of a certain SSID may be performed within the time slots assigned to that SSID.

Figure 2:
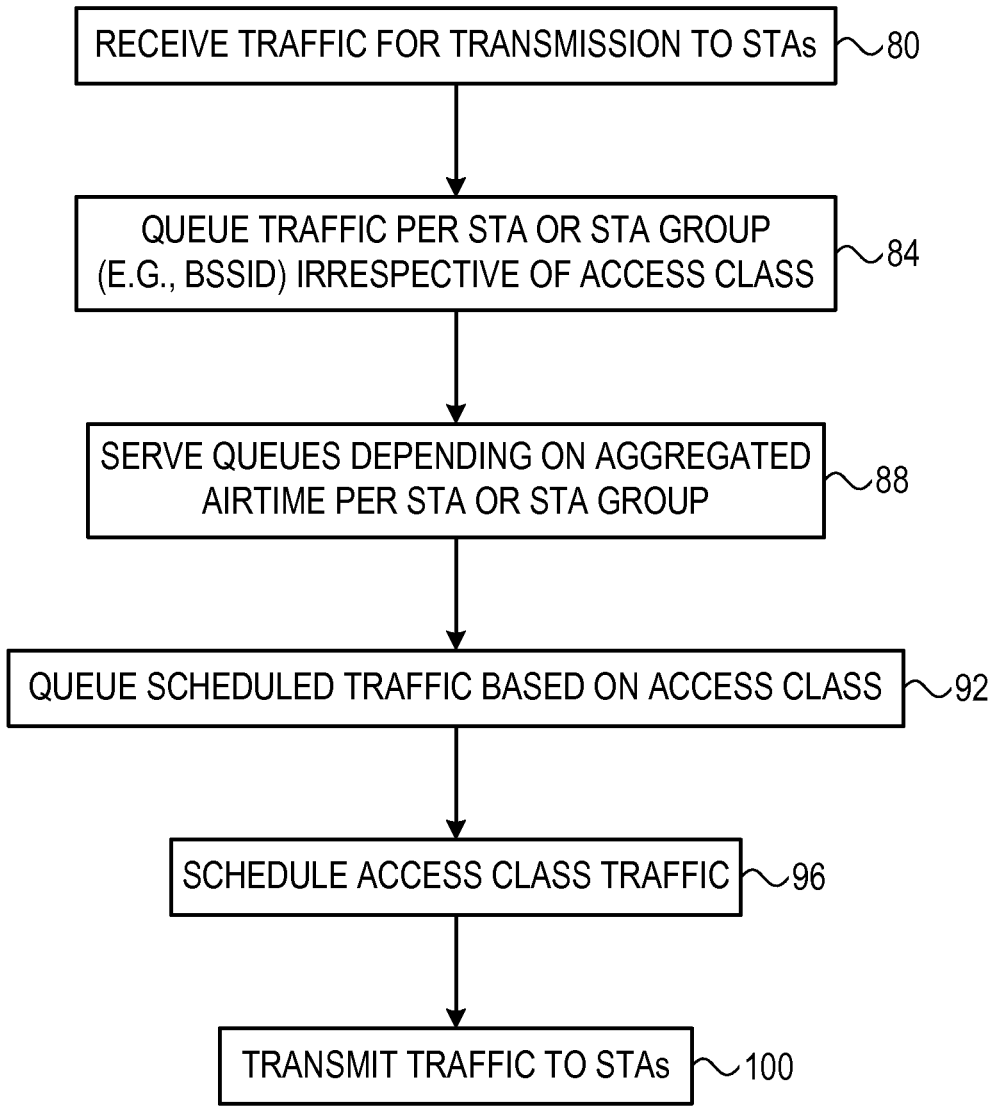
FIG. 2 is a flow chart that schematically illustrates a method for airtime-aware scheduling, in accordance with an embodiment of the present invention.

FIG. 2 is a flow chart that schematically illustrates a method for airtime-aware scheduling, performed by AP processor 36 in accordance with an embodiment of the present invention. The method begins with AP processor 36 accepting data items for transmission to STAs 28, at a data input step 80. Each data item (e.g., a packet) is typically addressed to a certain STA and associated with a certain AC class (QoS class), e.g., VO, VI, BE or BK.

AP processor 36 queues the data items in queues 56, per STA or group of STAs, at a STA-dependent queuing step 84. Queuing in queues 56 may be independent of access class. Scheduler 60 serves queues 56, i.e., assigns transmission time slots to the queued data items, at an airtime-aware scheduling step 88. The airtime scheduling is performed based on the MAAT criterion described above, i.e., based on aggregated airtime and irrespective of access class.

AP processor 36 distributes the data items produced by scheduler 60 to queues 64 based on access class, at a re-queuing step 92. In the example of FIG. 1, the AP processor distributes the data items among the VO, VI, BE and BK queues. Scheduler 68 schedules the re-queued data items, i.e., serves queues 64, at a QoS-based scheduling step 96. In some embodiments, steps 92 and 96 (and thus queues 64 and scheduler 68) are implemented in a standalone AC-based scheduling module that is separate from WLAN driver 48. The data items at the output of scheduler 68 are transmitted by transmitter 40 to STAs 28, at a transmission step 100.

Figure 3A:
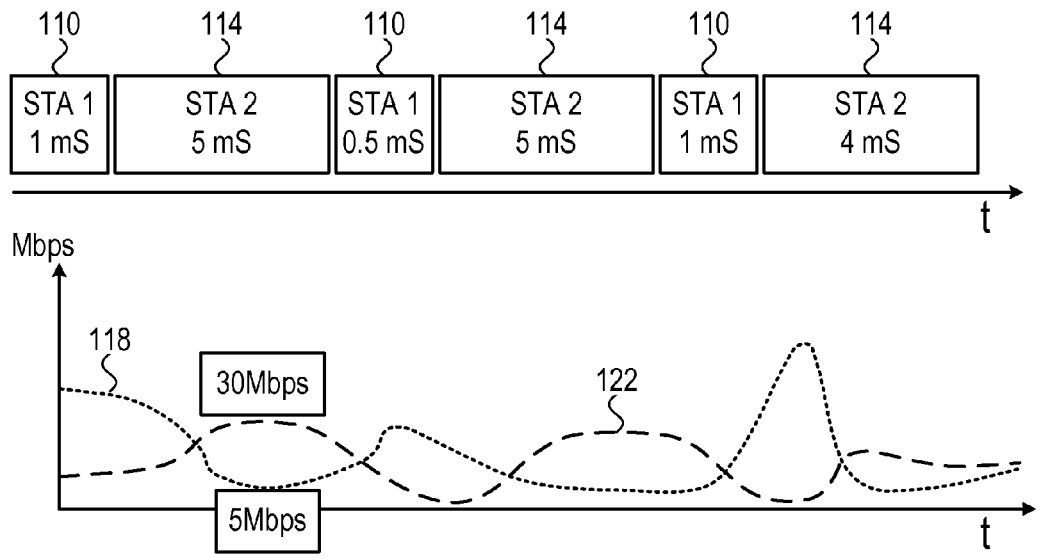
FIGS. 3A and 3B are graphs that schematically illustrate performance of airtime-aware scheduling, in accordance with an embodiment of the present invention.
Figure 3B:
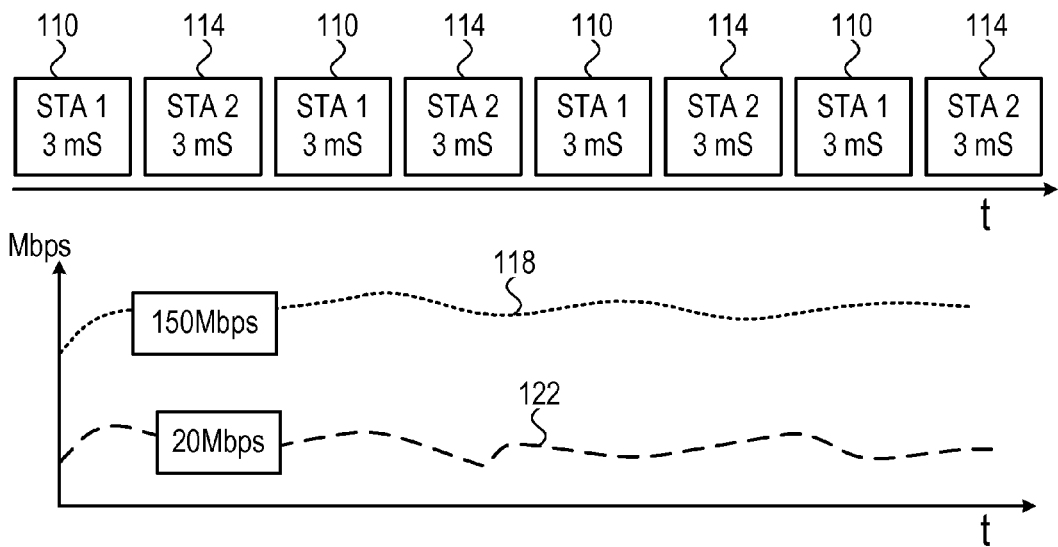

FIGS. 3A and 3B are graphs that schematically illustrate the performance of airtime-aware scheduling, in accordance with an embodiment of the present invention. FIG. 3A shows characteristic performance of conventional scheduling, and FIG. 3B shows the characteristic performance of airtime-aware scheduling of scheduler 60. In both figures, an AP serves two STAs denoted STA1 and STA2, which compete for airtime on the wireless channel. STA1 is located near the AP and therefore has a good link budget. STA2 is located far from the AP and therefore has poorer channel conditions.

When using conventional scheduling (FIG. 3A) the AP assigns STA2 a considerably higher portion of airtime than STA1, because of the poorer link budget of STA2. The top of FIG. 3A shows the allocation of time slots 110 to STA1 and time slots 114 to STA2. At the bottom of FIG. 3A, plots 118 and 122 show the throughput of STA1 and STA2, respectively. As can be seen in the figure, because of its problematic link budget, STA2 tends to dominate the channel and deprives STA1 of channel resources.

When using the disclosed MAAT-based scheduling (FIG. 3B), AP 24 divides the airtime fairly between STA1 and STA2, notwithstanding their different link budgets. The top of FIG. 3B shows the even distribution of airtime between slots 110 and 114. At the bottom of the figure, plots 118 and 122 again show the throughput of STA1 and STA2, respectively. In this case, however, STA1 enjoys consistent high throughput by virtue of its good link budget. STA2 is assigned its fair share of airtime, but achieves lower throughput due to its poorer link budget.

Uplink Considerations

Typically, AP 24 has full control with regard to scheduling of downlink transmissions (from the AP to the STAs), but has little or no control over uplink transmissions (from the STAs to the AP). In IEEE 802.11 networks, for example, each STA is autonomous in scheduling its uplink transmissions. The description above referred mainly to scheduling of downlink transmissions based on downlink airtime usage. The embodiments described above are therefore particularly suitable for downlink-centric applications such as most video or broadband data applications. Nevertheless, these techniques are useful in other applications, as well.

In alternative embodiments, AP 24 is able to account for uplink traffic in its downlink scheduling decisions, even though it cannot control the timing of uplink transmissions. In these embodiments, scheduler 60 measures the uplink airtime of each STA, and includes the uplink airtime in the aggregate airtime of the STA. This technique helps to distribute the airtime fairly in applications in which the uplink consumes a significant part of the total airtime.

In some embodiments, scheduler 60 assigns different weights to the downlink airtime and the uplink airtime when measuring the total aggregate airtime of a given STA. This sort of weighting enables the scheduler to control the relative impact of the downlink and the uplink airtimes on the aggregate airtime (and thus on the downlink scheduling).

In an example embodiment, to reduce the impact of uplink airtime, the uplink airtime is weighted by a factor smaller than one before being added to the downlink airtime to produce the aggregate airtime. To increase the impact of uplink airtime, the uplink airtime may be weighted by a factor greater than one.

In some WLANs, the AP manages both downlink and uplink transmissions. For example, in Hybrid-Coordination-Function Controlled Channel Access (HCCA) schemes, the AP assigns both uplink and downlink slots to the STAs. In such networks, scheduler 60 may schedule transmission slots based on MAAT in the uplink and/or in the downlink.

Scheduler 60 may perform the disclosed scheduling technique independently in each direction (i.e., in the downlink based on aggregate downlink airtime, and in the uplink based on aggregate uplink airtime). Alternatively, scheduler 60 may apply the disclosed scheduling technique jointly in each directions (i.e., based on the aggregate airtime on both uplink and downlink). As noted above, scheduler 60 may apply different weights to the uplink and downlink airtimes in the overall aggregate airtime measurement.

Soft Admission Control

In some practical cases, queue 56 of a certain STA may overflow as a result of the scheduling operation of scheduler 60. Overflow may occur, for example, in queues of STAs having poor link budgets that require large portions of airtime. When overflow occurs, data items addressed to this STA are discarded and lost.

In some embodiments, when overflow occurs in the queue of a certain STA, scheduler 60 may decide to further limit the airtime for this STA. The rationale behind this decision is that the STA in question suffers traffic disturbance anyhow, losing additional packets for this STA will not make a considerable difference, and it is preferable to allocate more airtime to other STAs. This embodiment is suitable, for example, for video streaming, in which queue overflow causes corruption regardless of the duration of the overflow.

In an example embodiment, the additional airtime limitation applied to such an STA by scheduler 60 depends on (e.g., is proportional to) the packet loss rate caused by the overflow. In another embodiment, in response to an overflow in queue 56, scheduler 60 does not allocate any additional airtime to the corresponding STA.

Scheduler 60 may revert back to normal airtime allocation to a given STA depending on various criteria, for example at regular intervals or upon detecting a reduction is packet loss rate for that STA.

Multi-BSS Scheduling

In some embodiments, AP 24 supports multiple virtual networks referred to as Basic Service Sets (BSSs). Each such virtual network is identified with a different respective BSS identifier (BSSID). At the Ethernet level, traffic related to different virtual networks may be distinguished using different Virtual Local Area Network (VLAN) tags. At the WLAN level, distinction between virtual networks can be made using different BSSIDs. This feature is referred to as Multi-BSS (MBSS).

An AP supporting MBSS may be used, for example, for separation between networks, for enforcing priorities among networks, for applying bandwidth control per network, of for any other purpose.

One important use case of MBSS is in a home network, in which the same AP supports (1) a home data network (e.g., for Internet browsing and file download), (2) a home video network (for service-provider video services), and (3) a cellular offload network (e.g., for home users and arbitrary passerby users). In such a home network, it is important to prevent traffic of cellular-offload users from dominating the AP throughput at the expense of home data and video users. Unless accounted for, cellular-offload users are likely to consume considerable airtime, since their link budgets are typically poorer than those of home users.

In some embodiments, scheduler 60 schedules airtime to the different virtual networks (BSSIDs) using the MAAT criterion, i.e., depending on the aggregate airtimes that were previously assigned to the respective networks irrespective of QoS class. This scheduling scheme maintains fairness among the different virtual networks (BSSIDs), and prevents scenarios in which one network (e.g., a cellular offload network) deprives another network (e.g., a home network) of airtime.

Although the description above refers to MBSS, the disclosed techniques can be used for scheduling airtime to any other suitable groups of STAs.

Prioritization Among Multiple Streams Addressed to the Same Terminal, and Multiple Service Classes within the Same Access Class In some scenarios, multiple streams belonging to the same Access Class (AC) are addressed to the same terminal 28, but it is nevertheless desirable to schedule the streams with different priorities. Consider, for example, an IP Television (IPTV) network in which a given terminal receives several video streams, such as a live video stream to the main screen, a Picture-In-Picture (PIP) stream, a Fast-Forward (FF) stream, a recorded TV stream, and/or a channel zapping stream. The service provider may be interested in assigning different priorities to these streams. For example, the PIP or FF streams can be assigned lower priority than the live video or recorded TV streams, even though they all belong to the same 802.11e AC. In some embodiments, scheduler 60 schedules such multiple streams that are all addressed to a single STA 28, using the MAAT criterion.

In other embodiments, scheduler 60 uses the MAAT criterion to assign different priorities to data items of different traffic categories, even though the data items all share the same Access Class (AC) or QoS class. For example, a service provider may wish to assign high priority to video streams sent from a home gateway to an Set-Top Box (STB), and lower priority to video streams sent to a tablet device, even though both streams belong to the video (VI) AC. Since the service provider controls the application layer, he may tag these two traffic categories differently. In some embodiments, scheduler 60 in AP 24 is aware to this tagging and can apply the MAAT criterion to enforce the different priorities.

Weighted Minimum-Aggregate Airtime Scheduling

In some embodiments, the data items (e.g., video streams) processed by AP 24 are assigned respective weights that are indicative of respective traffic categories. The streams may be categorized using one or more categorizations. In each categorization, the streams are assigned respective weights that specify their relative priorities that should be taken into account in airtime scheduling.

In an example embodiment, within the same WLAN and the same AP, a first set of weights $\alpha_i$ denotes the relative priorities of respective BSSIDs (e.g., 70% for home video, 20% for data and 10% for cellular offload), a second set of weights $\beta_i$ denotes the relative priorities of respective IPTV stream types (e.g., 80% for live video, 15% for PIP and 5% for FF), and a third set of weights $\lambda_i$ denotes the relative priorities between STB and tablet computer (e.g., 80% for STB and 20% for tablet). Alternatively, any other suitable number of categorizations, and any suitable number of traffic categories per categorization, may be used.

In some embodiments, scheduler 60 enforces the priorities among such traffic categories by weighting the aggregated airtimes with the appropriate weights. In an example embodiment, when a single categorization is used, scheduler 60 multiplies each aggregated airtime by the inverse of the appropriate weight (e.g., by $1/\alpha_i$. As a result, a higher weight decreases the aggregated airtime measurement, therefore increases the likelihood of the aggregated airtime measurement being minimal, and therefore increases the likelihood that the corresponding stream will be chosen for scheduling. By the same token, a smaller weight will increase the aggregated airtime measurement and thus reduce the likelihood that the stream will be chosen for scheduling.

When using multiple categorizations, scheduler 60 may multiply the aggregated airtime measurement by the inverse of all corresponding weights. For example, when the streams are categorized both by BSSID (using $\alpha_i$) and by IPTV stream type (using $\beta_i$), scheduler 60 may multiply each aggregated airtime measurement by $1/(\alpha_i\beta_i)$.

As explained above with regard to non-weighted scheduling, the weighted-MAAT scheme may be combined with IEEE 802.11e AC-based scheduling in any suitable way. In one embodiment, weighted-MAAT is applied regardless of access class, and the scheduled streams are then provided to the MAC unit for AC-based scheduling. In another example embodiment, weighted-MAAT scheduling is applied separately within the streams of each access class.

In yet another embodiment, the different access classes are accounted for in the weighted-MAAT scheduling, as an additional traffic category having its own set of weights $\omega_i$. For example, the application layer may assign the VI access $\omega_i$=70%, and $\omega_i$=10% to the BE access class. Alternatively, any other suitable weighting can be used.

In various embodiments, the set or sets of weights can be determined in different ways. In some embodiments, the weights of each data item (e.g., video stream) are set by an upper-layer application and reported to AP 24 using an agreed-upon interface. In other embodiments, AP processor 36 may assign the weights and tag the data items, e.g., by performing deep packet inspection on the traffic or in accordance with a predefined list of MAC addresses.

In an example embodiment, AP processor 36 distinguishes between data items delivered to STBs in a video network by inspecting the packets for a certain known range of MAC addresses, and between streams destined to a tablet running a service-provider application by inspecting the packet for known attributes of this Application. In this manner, a WLAN can be customized to assign priority and maintain QoS to data items (e.g., video streams) that it can classify independently in accordance with known attributes. This technique can be used to deploy WLAN sockets that support MAAT scheduling (or weighted MAAT scheduling) even in systems that do not support stream tagging.

The above weighting and tagging schemes are not limited to MAAT or weighted MAAT scheduling, but rather applicable to any other suitable scheduling scheme. Another example scheduling metric is Minimum Aggregate Bit Transferred (MABT) in which a steam that transferred the minimum data so far receives the highest priority.

Using 802.11E Access Classes for Generic Priority Assignment

In some embodiments, AP processor 36 uses the IEEE 802.11e access classes (VO, VI, BK and BE) as a general platform for assigning priorities to data items, regardless of the actual access classes or traffic type of the data items. In other words, the AP processor uses the known priorities assigned by AC-based scheduler 68 to the VO, VI, BK and BE access classes, to enforce priorities among any desired types of data items.

Consider, for example, the multi-BSS application discussed above. In some embodiments, AP processor 36 associates data items belonging to a high-priority BSS with a high-priority access class, regardless of the actual traffic type. In an example configuration, the AP processor may associate home-BSS traffic with the VI access class, guest-BSS traffic with the BE access class, and cellular-offload-BSS traffic with the BG access class.

In these embodiments, association of data items with access classes may be performed internally by AP processor 24. This task may be performed, for example, at the gateway router level, at the WLAN host CPU bridge level, by WLAN driver 48, or by any other element of the AP processor.

In an example embodiment, WLAN driver 48 associates each BSS with a respective 802.11e access class in accordance with service provider guidelines or priorities. Such guidelines or priorities may be provided to the AP, for example, using VLAN tagging, MAC address tables, or any other suitable means. WLAN driver 48 effectively overrides the conventional mapping between Ethernet Class of Service (CoS) and WLAN Access Class (AC), in which the eight priorities of IEEE 802.1p are mapped into four ACs of IEEE 802.11e.

This scheme of exploiting the 802.11e ACs can be combined with the weighted MAAT scheme described above. In such a combination, the weighted MAAT scheme can still be used to prioritize data items within each AC according to class of service, or when several BSSs are mapped to the same AC (e.g., when both the guest-BSS and cellular-offload-BSS are mapped to the BE access class).

The above-described scheme of exploiting the 802.11e ACs can be used for prioritizing other types of data items, not only BSSs. For example, in the use case of an IPTV application that sends multiple video streams to the same terminal, live video may be mapped to the VO access class, recorded TV may be mapped to the VI access class, and PIP and FF streams may be mapped to the BE access class.

MAAT Scheduling of TCP Traffic

When scheduling Transmission Control Protocol (TCP) streams, the above-described scheduling schemes are not always able to provide fairness by controlling airtime allocation alone, because the TCP stack tends to permit one stream to dominate the airtime at the expense of other streams, resulting in reduction of throughput from the TCP stack. In scenarios of this sort, giving priority to these stations using the MAAT criterion is not sufficient to enable their TCP stack to increase throughput.

In some embodiments, scheduler 60 avoids such scenarios by periodically checking for a dominant STA whose actual aggregate airtime is considerably higher than its planned (weighted) share. Most likely, the reason for this discrepancy is that the TCP stack has reduced the throughput of outgoing traffic to the other stations. Typically, scheduler 60 marks a STA as dominant if its airtime exceeds a predetermined threshold.

Upon identifying a dominant STA, scheduler 60 intentionally throttles-down the transmission throughput to this STA for a configurable period of time. Throttling-down the throughput may involve temporarily delaying outgoing traffic to the STA, or reducing the throughput of outgoing traffic to the STA. The delay or throughput reduction typically does not break the TCP flow of the dominant STA. The airtime that was freed by reducing service to the dominant STA will typically be used by the TCP algorithm in the other STAs to reach a stable throughput. After a certain time, scheduler 60 resumes normal service to the previously-dominant STA.

In some embodiments, scheduler 60 is TCP-aware, i.e., it is able to distinguish between TCP and non-TCP (e.g., UDP) streams. This classification can be performed, for example using higher-layer tagging or using deep packet inspection. In these embodiments, scheduler 60 applies the above-described dominance mitigation scheme only to TCP streams. In other embodiments, scheduler 60 cannot distinguish between TCP and non-TCP traffic. In these embodiments the scheduler applies the dominance mitigation scheme to all streams.

Alternative AP Configurations

As noted above, the disclosed techniques can be implemented using various AP configurations. In particular, the various AP elements can be partitioned between Integrated Circuits (ICs) in various ways. FIGS. 4A-4C below show three possible examples. The configurations of FIGS. 4A-4C are depicted purely by way of example, and any other suitable AP configuration may be used.

FIG. 4A is a block diagram that schematically illustrates an AP, in accordance with an embodiment of the present invention. In this example, a single System on Chip (SoC) processor 130 comprises a network stack 134, a WLAN driver 138, a MAAT scheduler and queues 144 (comprising airtime-aware scheduler 60 and queues 56), a WLAN MAC 148 (comprising AC-based queues 64 and AC-based scheduler 68), and transmitter 40.

FIG. 4B is a block diagram that schematically illustrates an AP, in accordance with an alternative embodiment of the present invention. In this example, the AP elements are implemented in two ICs—A host processor 156 and a WLAN processor 160. Host processor 156 comprises network stack 134, WLAN driver 138 and MAAT scheduler & queues 144. WLAN processor 160 comprises WLAN MAC 148 and transmitter 40. WLAN processor 160 typically runs the MAC hardware without a Central Processing Unit (CPU).

FIG. 4C is a block diagram that schematically illustrates an AP, in accordance with yet another embodiment of the present invention. In the example of FIG. 4C, the AP elements are again implemented in a host processor 164 and a WLAN processor 168. In this example, however, the WLAN processor comprises a CPU, and MAAT scheduler and queues 144 reside in the WLAN processor rather than in the host processor. Host processor 164 runs the network track and a partial WLAN driver 172 (referred to as upper MAC). WLAN processor 168 runs the lower part of the WLAN driver, the MAC firmware and hardware, as well as both airtime-aware and AC-based schedulers.

Although the embodiments described herein mainly address WLAN APs, the methods and systems described herein can also be used in other applications, such as in video gateways, data gateways, home routers, video bridge, gaming consoles and various other types of communication devices.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for communication, comprising:
   accepting, in an Access Point (AP), downlink data items for transmission over a wireless downlink channel to multiple terminals served by the AP;
   assessing aggregate airtimes for the respective terminals, by summing, for each terminal, an aggregate downlink airtime that was previously allocated to the terminal on the wireless downlink channel and an aggregate uplink airtime that was previously used by the terminal on a wireless uplink channel from the terminal to the AP; and scheduling transmission of the downlink data items on the wireless downlink channel, depending one aggregate airtimes assessed for the terminals.

2. The method according to claim 1, wherein scheduling the transmission comprises scheduling the transmission of the downlink data items regardless of Quality-of-Service (QoS) classes with which the downlink data items are associated.

3. The method according to claim 1, wherein scheduling the transmission comprises allocating a next transmission slot to a terminal that was previously allocated a smallest aggregate airtime among the terminals served by the AP.

4. The method according to claim 1, and comprising periodically resetting the aggregate airtimes.

5. The method according to claim 1, wherein assessing the aggregate airtimes comprises assessing respective differences between the aggregate airtimes and a minimal aggregate airtime, and wherein scheduling the transmission comprises scheduling the transmission depending on the differences.

6. The method according to claim 1, wherein scheduling the transmission comprises assigning to the terminals respective time slots having lengths that do not exceed a predefined maximum length.

7. The method according to claim 1, and comprising scheduling the transmission of uplink data items from the terminals to the AP depending on the aggregated uplink airtimes assigned to the respective terminals.

8. The method according to claim 1, wherein each of the terminals is associated with one of multiple virtual networks, and wherein scheduling the transmission comprises assigning airtime to each of the virtual networks depending on the assessed aggregate airtimes.

9. The method according to claim 8, wherein the multiple virtual networks are identified with respective different Basic Service Set Identifiers (BSSIDs).

10. The method according to claim 1, wherein scheduling the transmission comprises assigning airtime to multiple streams that are addressed to a same terminal.

11. The method according to claim 1, wherein scheduling the transmission comprises assigning airtime to multiple different streams that belong to a same QoS class.

12. A wireless Access Point (AP), comprising:
a transmitter, which is configured to transmit downlink data items over a wireless downlink channel to multiple terminals served by the AP; and
a processor, which is configured to assess aggregate airtimes for the respective terminals, by summing, for each terminal, an aggregate downlink airtime that was previously allocated to the terminal on the wireless downlink channel and an aggregate uplink airtime that was previously used by the terminal on a wireless uplink channel from the terminal to the AP, and to schedule transmission of the downlink data items on the wireless downlink channel depending on aggregate airtimes assessed for the terminals.

13. The AP according to claim 12, wherein the processor is configured to schedule the transmission of the downlink data items regardless of Quality-of-Service (QoS) classes with which the downlink data items are associated.

14. The AP according to claim 12, wherein the processor is configured to allocate a next transmission slot to a terminal that was previously allocated a smallest aggregate airtime among the terminals served by the AP.

15. The AP according to claim 12, wherein the processor is configured to periodically reset the aggregate airtimes.

16. The AP according to claim 12, wherein the processor is configured to assess respective differences between the aggregate airtimes and a minimal aggregate airtime, and to schedule the transmission depending on the differences.

17. The AP according to claim 12, wherein the processor is configured to schedule the transmission by assigning to the terminals respective time slots having lengths that do not exceed a predefined maximum length.

18. The AP according to claim 12, wherein the processor is configured to schedule the transmission of uplink data items from the terminals to the AP depending on the aggregated uplink airtimes assigned to the respective terminals.

19. The AP according to claim 12, wherein each of the terminals is associated with one of multiple virtual networks, and wherein the processor is configured to assign airtime to each of the virtual networks depending on the assessed aggregate airtimes.

20. The AP according to claim 19, wherein the multiple virtual networks are identified with respective different Basic Service Set Identifiers (BSSIDs).

21. The AP according to claim 12, wherein the processor is configured to schedule the transmission by assigning airtime to multiple streams that are addressed to a same terminal.

22. The AP according to claim 12, wherein the processor is configured to schedule the transmission by assigning airtime to multiple different streams that belong to a same QoS class.

23. A system, comprising:
multiple terminals; and
an Access Point (AP), which is configured to transmit downlink data items over a wireless downlink channel to the terminals, to assess aggregate airtimes for the respective terminals, by summing, for each terminal, an aggregate downlink airtime that was previously allocated to the terminal on the wireless downlink channel and an aggregate uplink airtime that was previously used by the terminal on a wireless uplink channel from the terminal to the AP, and to schedule transmission of the downlink data items on the wireless downlink channel depending on aggregate airtimes assessed for the terminals.

* * * * *